H. F. MANLEY.
AUTOMOBILE.
APPLICATION FILED APR. 12, 1917.
1,303,350.
Patented May 13, 1919.
3 SHEETS—SHEET 1.
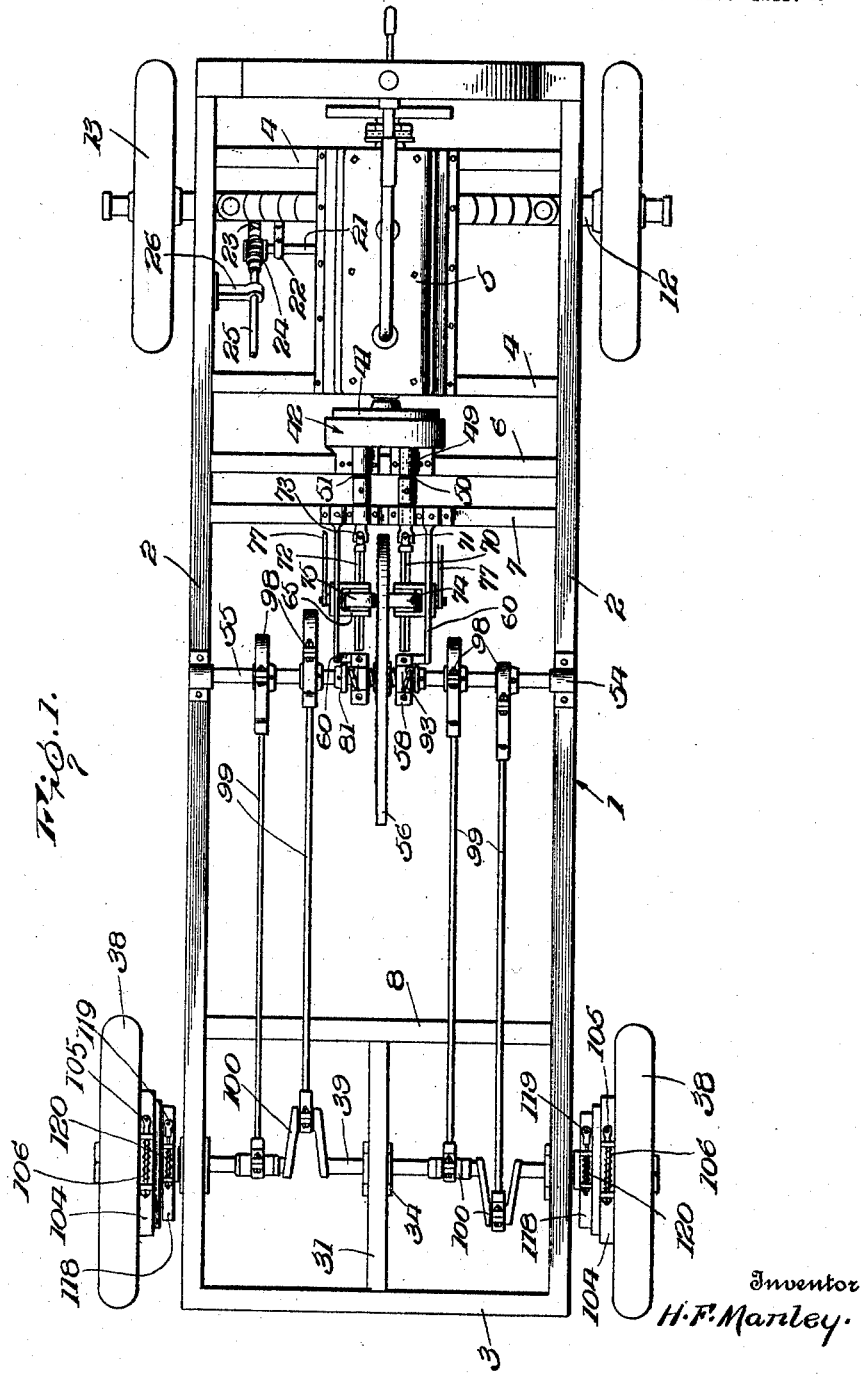

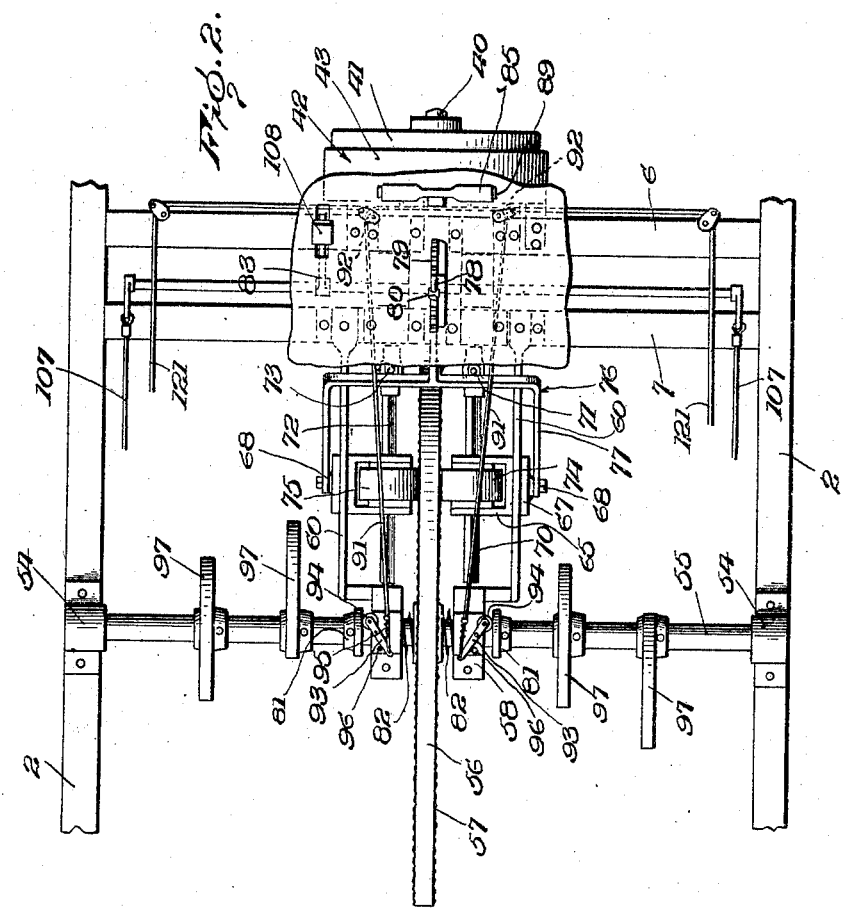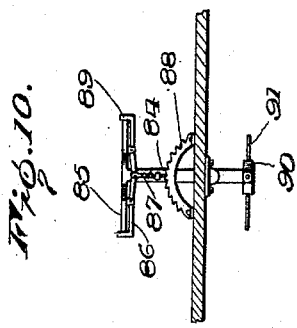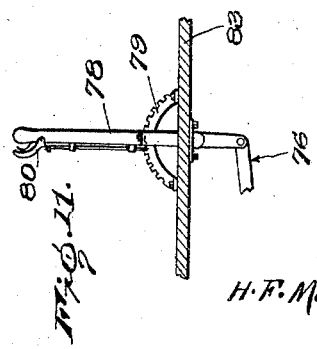

H. F. MANLEY.
AUTOMOBILE.
APPLICATION FILED APR. 12, 1917.

1,303,350.

Patented May 13, 1919.

Inventor
H. F. Manley.

By
[signature] Attorneys

UNITED STATES PATENT OFFICE.

HOMER F. MANLEY, OF ROCHESTER, NEW YORK.

AUTOMOBILE.

1,303,350.   Specification of Letters Patent.   Patented May 13, 1919.

Application filed April 12, 1917. Serial No. 161,581.

*To all whom it may concern:*

Be it known that I, HOMER F. MANLEY, a citizen of the United States, residing at Rochester, in the county of Monroe and State of New York, have invented certain new and useful Improvements in Automobiles, of which the following is a specification.

My invention relates to new and useful improvements in automobiles and particularly in the transmission and control of power from the engine to the wheels, one of the primary objects of my invention being the elimination of the present types of transmission gearings and differential gearings which are heavy, expensive and easily injured in use.

In the drawings:

Figure 1 is a plan view of an automobile chassis constructed in accordance with my invention;

Fig. 2 is a fragmentary plan view upon an enlarged scale, showing the transmission mechanism employed;

Fig. 10 is an elevation of a compound pedal controlling the direction of power transmission;

Fig. 11 is an elevation of a hand lever and latch controlling the rate of power transmission.

Figure 3:
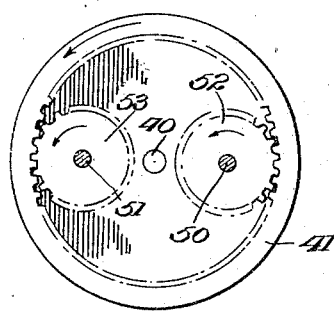
Fig. 3 is a view of one element of the transmission mechanism.

In the drawings, 1 indicates the main frame of the chassis, being preferably formed of iron or steel members substantially U-shaped in cross section and including side frame members 2 and end frame members 3. In addition, this frame, adjacent its forward end, is braced by spaced transverse frame members 4, which support an internal combustion engine 5, of the usual or any preferred type, and at the rear of these braces with a second pair of spaced braces 6 and 7 which support the transmission mechanism. An additional transverse brace 8 also connects the side members of the frame in spaced relation to the rear end and helps support the chassis upon the rear axle of the vehicle, as will be later explained.

The front axle has swingingly mounted thereon steering heads 12 which, at their outer ends, receive the front wheels 13. A transversely disposed shaft 21 is journaled in suitable brackets 22 and carries at its free end a worm wheel 23 which meshes with a worm 24 upon the lower end of the steering column 25 which has support in one or more bearings 26. Gearing (not shown) connects the transverse shaft 21 with the steering heads whereby turning of the steering column will act to simultaneously swing the steering heads to turn the front wheels so that they will always lie in parallel planes. The rear live axle is journaled in bearing boxes which have yieldable connection with the frame of the chassis, the frame including a longitudinal brace member 31 disposed centrally of the side frame members and extending between the rear transverse brace 8 and the rear end member 3.

Rear drive wheels 38 are mounted upon the live rear axle 39.

Figure 7:
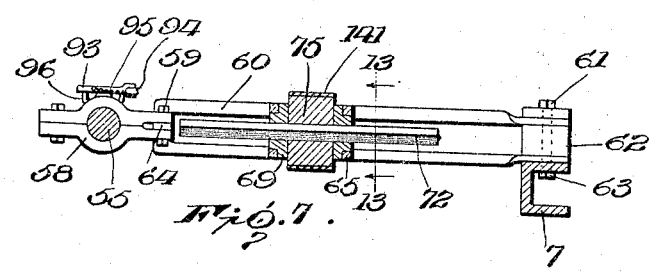
Fig. 7 is a fragmentary sectional view, showing the manner of mounting one of the friction rollers.
Figure 8:
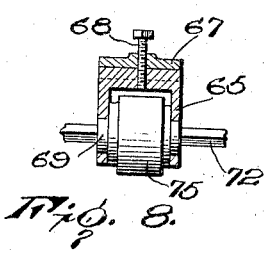
Fig. 8 is a fragmentary sectional view taken at right angles to that shown in Fig. 7.
Figure 9:
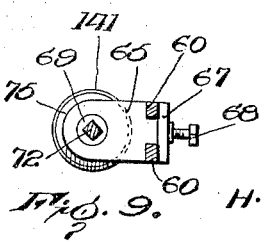
Fig. 9 is a sectional view taken on the line 13—13 of Fig. 7, looking in the direction of the arrows.

The crank shaft 40 of the engine 5 terminates slightly at the rear of the transverse brace 4 and an internal gear 41, which also forms the fly wheel, is keyed or otherwise fixed to the crank shaft. This internal gear is closed at its rear end by a face plate or housing cap 42 having a peripheral flange 43 carrying a packing ring 44 which engages against the outer peripheral face of the gear and which is held in place by a retaining ring 45 threaded or otherwise secured within the flange 43. This face plate 42 has attaching ears or brackets 46 by means of which it is secured to the transverse brace 6. This face plate or rear housing 42 is formed in upper and lower sections 47 and 48 and the upper section carrier spaced parallel bearings 49 which journal shafts 50 and 51 which, at their inner ends, carry pinions 52 and 53 meshing with the internal gear. Journaled in suitable bearings 54 fixed upon the side frame members and in transverse alinement with each other, is a jack shaft 55 and keyed or otherwise fixed upon the intermediate portion of this jack shaft is a friction disk 56, the side faces of which may be roughened or corrugated, if desired, as indicated at 57. Compound bearings 58 are slidably mounted upon the shaft 55, one at either side of the disk 56, and pivoted in the forward ends of these bearings by pivots 59 are the rear ends of U-shaped guides 60. The free end of each guide is pivotally connected to the frame brace 7 by means of a pivot bolt 61 passed through the upper arm of the guide, through a spacer collar 62 inserted between the arms, through the lower arm of the guide, through the brace and secured by a nut 63. As best shown in Figs. 2 and 7 of the drawings, each of these guides has an inwardly offset terminal 64 through which the pivot bolt 59 passes so that, under normal conditions, the guides extend in substantially parallel spaced relation to the friction disk and one at either side thereof. A yoke 65 has its outer face cut-away to provide spaced seats, see Fig. 9, for the reception of the upper and lower sides of a coöperating guide and an anchoring plate 67 secured by a bolt 68 engages against the outer face of the guide so that the yoke is secured to the guide for free reciprocation with its arms directed inwardly toward the disk. Rotatably journaled in the arms of each yoke is a bearing 69 and these bearings are formed with alined squared bores to receive squared shafts. One squared shaft 70 has universal joint connection, as shown at 71, with the free end of the shaft 50, and a corresponding squared shaft 72 has universal joint connection 73 with the free end of the shaft 51. These squared shafts extend through the bearings of the adjacent yokes and through squared bores formed in friction rollers 74 and 75, respectively, so that power will be transmitted from the engine shaft to the rollers at all times that the shaft is running while the rollers may be moved forwardly and rearwardly to bring them into transverse alinement with any desired portion of the friction disk 56. A link 76 has diverging arms 77 which extend rearwardly and through which the bolts 68 pass so that the link is pivotally connected to both yokes and the forward end of the link has pivotal connection with a hand lever 78 which swings over a segment 79 having squared notches and which is held in desired locked position by means of a hand latch mechanism 80. It will, therefore, be clear that by manipulation of the hand lever 78, both rollers may be simultaneously swung to the front or rear, dependent upon the direction of movement of the hand lever.

Abutments in the form of collars 81 are fixed to the shaft 55 in spaced relation to the outer faces of the bearings 58 and serve as a means for limiting the outward swinging of these bearings under the action of helical springs 82 engaging between the bearings and the friction disk and tending to at all times hold the guides in such positions as to keep the friction rollers out of engagement with the disk. Projecting upwardly through the floor 83 of the vehicle for transverse swinging movement is a pedal shank 84 having oppositely and laterally directed arms 85. Pivoted intermediate their length to the under faces of these arms are levers 86 which, at their inner ends, have pivotal connection with a spring pressed pawl 87 engaging the toothed segment 88 and which, at their outer ends, have upwardly projecting toe-pieces 89 by means of which they may be swung to raise the spring pressed pawl or latch 87. The toothed segment 88 has its right hand portion formed with teeth arranged to coöperate with the latch to lock the lever against movement to intermediate position when it has been swung to the right, while the left hand portion of the segment has oppositely formed teeth to lock the lever when it is swung to the left. It will, therefore, be apparent that the driver of the vehicle, by placing his foot upon one side or the other of the pedal, may depress one or the other of the levers 86 to release the pawl and may then swing the pedal to the side upon which his foot rests, and by holding the pedal in such position and releasing the adjacent lever may lock the pedal in position. The lower end of the pedal or lever shank 84 has oppositely extending eyes 90 which receive the ends of wires or cables 91 which are passed rearwardly about suitable pulleys 92 and connected at their rear ends to the inner ends of levers 93 which are pivoted intermediate their length upon the bearings 58 and which, at their free ends, carry rollers 94 which engage against the inner faces of the stop collars 81. Springs 95 normally force those ends of the levers having connection with the cables 91 rearwardly into engagement with stop lugs 96 so that the springs 82 may hold the bearings 58 in outermost position and keep the friction rollers out of engagement with the friction disk. However, when strain is exerted upon either of the cables 91, that lever to which it is connected will be swung forwardly, causing the roller 94 carried by it to be thrust against the adjacent collar 81 and, consequently, to cause sliding of the bearing 58 carrying the lever toward the friction disk to bring the coöperating friction roller 75 into more or less close frictional engagement with the disk, dependent upon the strain exerted upon the cable.

From the foregoing description, it will be apparent that power may be transmitted from the engine shaft to the jack shaft 55 to rotate the jack shaft in either direction desired and at any given speed ratio within the limits imposed by the size of the friction disk and the size of the friction rollers. It will further be clear that both the direction and speed at which the power is transmitted are controlled by the foot pedal 85 and hand lever 78.

Fixed upon the jack shaft 55, is a plurality of eccentric disks 97 each having the same amount of throw and eccentric straps 98 mounted about these eccentrics are connected by eccentric rods 99 with crank arms 100 formed in the rear axle 39. Four eccentrics and four crank arms are provided, two of these being arranged in opposition to each other and at right angles to the remaining two which are also in opposition to each other so that there is no time when all of the eccentrics and crank arms will be on dead center, at least two at all times acting to positively transmit power from the jack shaft to the rear axle.

The hub portions of the rear wheels 38 are loosely mounted upon the ends of the rear axle 39 and may be held against displacement from the axle by any suitable means. Fixed to the hubs of these wheels, are brake drums about which are mounted external brake bands 104, the ends of which may be drawn together to tighten the bands about the drums by strain exerted upon connecting links 105 to compress springs 106 which normally hold the bands in uncontracted position. Rods, cables or other suitable connecting means 107 lead from the links 105 to a suitable brake pedal 108. The rear wheels are connected to the rear axle by pawl and ratchet escapement mechanisms including lever arms carrying rollers which, in active position of the pawls, engage against a normally slack resilient band 118 corresponding to a brake band and mounted to have its ends drawn together to reduce the diameter of the band by a link 119. A spring 120 normally serves to hold the band in expanded position and when the band is contracted, the lever arms of the escapement mechanisms will be swung to move the pawls out of active position. Wires, cables or other suitable connecting means may lead from the links 119 to the eyes 90 of the foot pedal 85 so that swinging of the foot pedal in a direction to cause transmission of power to the rear axle to drive the vehicle forwardly will contract the band 118 of the right wheel so as to hold its pawls out of the engagement with the ratchet teeth and leave the wheel idle. In like manner, swinging of the pedal 85 in the opposite direction will swing the pawls of the left wheel out of engagement, while leaving the pawls of the right wheel in engagement. Preferably, these cables are so proportioned that with the foot pedal in central or neutral position, both sets of pawls will be held out of engagement so that the wheels may be entirely free of the axle for coasting purposes.

Figure 6:
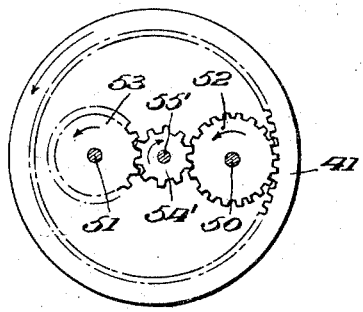
Fig. 6 is a view corresponding to Fig. 7, showing a slightly different arrangement.
Figure 4:
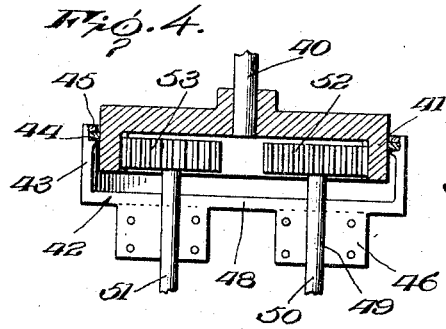
Fig. 4 is a sectional view taken on the line 8—8 of Fig. 5, looking in the direction of the arrows.
Figure 5:
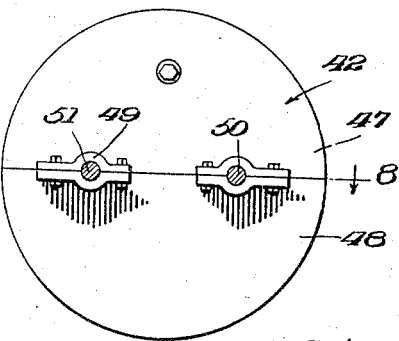
Fig. 5 is a rear elevation of the transmission element casing.

It is believed that the foregoing description, taken in connection with the drawings, is sufficient to afford a clear understanding of the operation of my invention. It should, however, be noted that various modifications are possible. For instance, in Fig. 6 I have illustrated a modified means for transmitting power from the crank shaft of the engine to the shafts carrying the friction rollers. As there shown, the crank shaft is fixed to the internal gear 41 in the usual manner. The shafts 50 and 51 carry the pinions 52 and 53 and both mesh with an idler pinion 54' mounted upon a stub shaft 55' carried by the face plate 42. The pinion 52 meshes with the internal gear, while the pinion 53 does not. As a result, the pinions 52 and 53 are both driven in the same direction, as is the case with the form shown in Figs. 3 and 4.

Although I have illustrated and described my invention in all its details of construction, it will of course be understood that I do not limit myself to such details but reserve the right to make any changes, within the scope of the appended claims, without in the slightest degree departing from the spirit of my invention. For instance, a band may be shrunk, vulcanized or otherwise secured about the periphery of the friction rollers 75, this band being formed of babbit metal, heavy webbing, rubber or other substance which will prevent possible slipping of the rollers when power is applied. Furthermore, headlights may be mounted upon the steering heads so as to turn to direct their rays in the direction in which the front or steering wheels of the vehicle are turned.

Having thus described the invention, what is claimed as new is:

1. In a motor vehicle, the combination of a rear axle, a jack shaft, operative connection between said axle and the jack shaft, a master gear on the jack shaft, pivotally mounted guides at the sides of said gear, means for holding said guides normally away from the gear, means for moving the guides selectively to the gear, a gear supported by each guide, means for rotating said gears in the same direction, and means for shifting said gears longitudinally of the guides.

2. In a motor vehicle, the combination with a jack shaft, of a disk thereon, rollers disposed at opposite sides of the disk, means for rotating said rollers in the same direction, means for holding the rollers normally out of engagement with the disk, means for selectively moving the rollers into engagement with the disk, and means for shifting the rollers radially of the disk.

3. In a motor vehicle, the combination of a jack shaft, a disk thereon, bearings mounted slidably on the shaft at the sides of the disk, means for holding said bearings normally away from the disk, guides each attached at one end to one of said bearings and pivotally supported at its opposite end, yokes slidably mounted on said guides, rollers journaled in said yokes, means for rotating the rollers, means for shifting the yokes longitudinally of the guides, and means acting on the slidable bearings to selectively move them toward the disk and thereby bring one of the rollers into engagement with the disk.

4. In a motor vehicle, the combination of a jack shaft, a disk thereon, shafts disposed at the sides of the disk and at an angle to the jack shaft, means for rotating said shafts in the same direction, rollers mounted slidably on said shafts and constrained to rotate therewith, supports for said rollers, means acting on said supports to hold the rollers normally away from the disk, selective means for moving the supports and rollers toward the disk, and means acting on the supports to move the rollers longitudinally of their shafts.

5. In a motor vehicle, the combination of a jack shaft, a disk thereon, slidable bearings at the sides of the disk, springs disposed between the bearings and the disk to hold the bearings normally away from the disk, guides pivoted at their rear ends to said bearings and pivotally supported at their front ends, yokes slidably mounted on the guides, rollers carried by the yokes to engage the disk, means for rotating said rollers, abutments on the jack shaft adjacent and at the outer sides of the slidable bearings, levers pivoted on said bearings and having their outer ends engaging against said abutments, and means acting on the inner ends of said levers to selectively vibrate the same and effect movement of the slidable bearings.

6. In a motor vehicle, a rear axle, a jack shaft, power transmitting means between the two, a friction disk on the jack shaft, rotatably mounted shafts disposed at either side of the disk and movable toward and away from the same, friction rollers mounted on and driven by the shafts and selectively engageable with the disk, a drive shaft, and means for transmitting power from the drive shaft to the shafts carrying the friction rollers to turn such shafts in the same direction, said means including an internal gear fixed to the drive shaft, pinions mounted upon the roller carrying shafts and one of them meshing with the internal gear, and an idler pinion meshing with both of the first mentioned pinions.

In testimony whereof I affix my signature.

HOMER F. MANLEY. [L. S.]

Copies of this patent may be obtained for five cents each, by addressing the "Commissioner of Patents, Washington, D. C."